(12) United States Patent
Wilczek et al.

(10) Patent No.: US 7,002,338 B1  
(45) Date of Patent: Feb. 21, 2006

(54) ROTATION ANGLE SENSOR

(75) Inventors: Klaus Wilczek, Suedkirchen (DE); Friedhelm Schmidtke, Bergkamen (DE)

(73) Assignee: AB Elektronik GmbH, Werne (DE)

( * ) Notice: Subject to any disclaimer, the term of this patent is extended or adjusted under 35 U.S.C. 154(b) by 0 days.

(21) Appl. No.: 10/339,720

(22) Filed: Jan. 9, 2003

(30) Foreign Application Priority Data

Jan. 10, 2002 (DE) .......................... 202 00 302 U

(51) Int. Cl.  
*G01B 7/30* (2006.01)

(52) U.S. Cl. .............................. 324/207.25; 324/207.2; 324/207.21

(58) Field of Classification Search ............ 324/207.2, 324/207.21, 207.22, 207.25; 338/32 R, 32 H  
See application file for complete search history.

(56) References Cited

U.S. PATENT DOCUMENTS

| | | | | |
|---|---|---|---|---|
| 4,642,496 A | * | 2/1987 | Kerviel et al. ............. | 310/68 B |
| 5,164,668 A | * | 11/1992 | Alfors ..................... | 324/207.2 |
| 6,163,148 A | * | 12/2000 | Takada et al. .............. | 324/226 |
| 6,252,394 B1 | * | 6/2001 | Roze et al. ............. | 324/207.12 |
| 6,356,073 B1 | * | 3/2002 | Hamaoka et al. ......... | 324/207.2 |

FOREIGN PATENT DOCUMENTS

| | | |
|---|---|---|
| DE | 198 57 017 | 6/1999 |
| EP | 1 024 267 | 8/2000 |
| EP | 1 054 237 | 11/2000 |

* cited by examiner

*Primary Examiner*—Jay Patidar  
(74) *Attorney, Agent, or Firm*—Milde & Hoffberg, LLP

(57) ABSTRACT

A Rotation angle sensor includes the following elements:
(a) a sensor housing;
(b) a rotor unit having at least one segment magnet, mounted for rotation in the housing;
(c) a stator unit having a magnetic flux detection device, mounted in the housing adjacent the rotor;
(d) a bearing shaft unit having a bearing shell and a radial shaft seal, mounted in the housing, the bearing shaft forming a shaft receiver recess mounted in the rotor unit; and
(e) a rotor actuation unit inserted into the shaft receiver recess. The rotor actuation unit includes a shaft element for moving the rotor unit with respect to the stator unit, whereby during manufacture, the bearing shell is inserted into the housing unit at least to the point of the rotor unit, and the radial shaft seal is inserted behind it, and the shaft element is pressed past the radial shaft seal and the bearing shell into the shaft receiver recess.

11 Claims, 3 Drawing Sheets

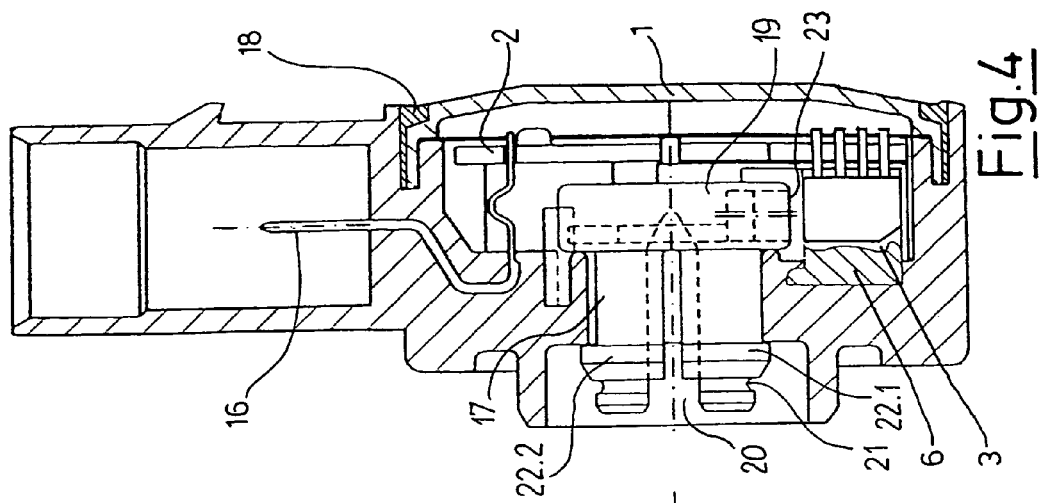
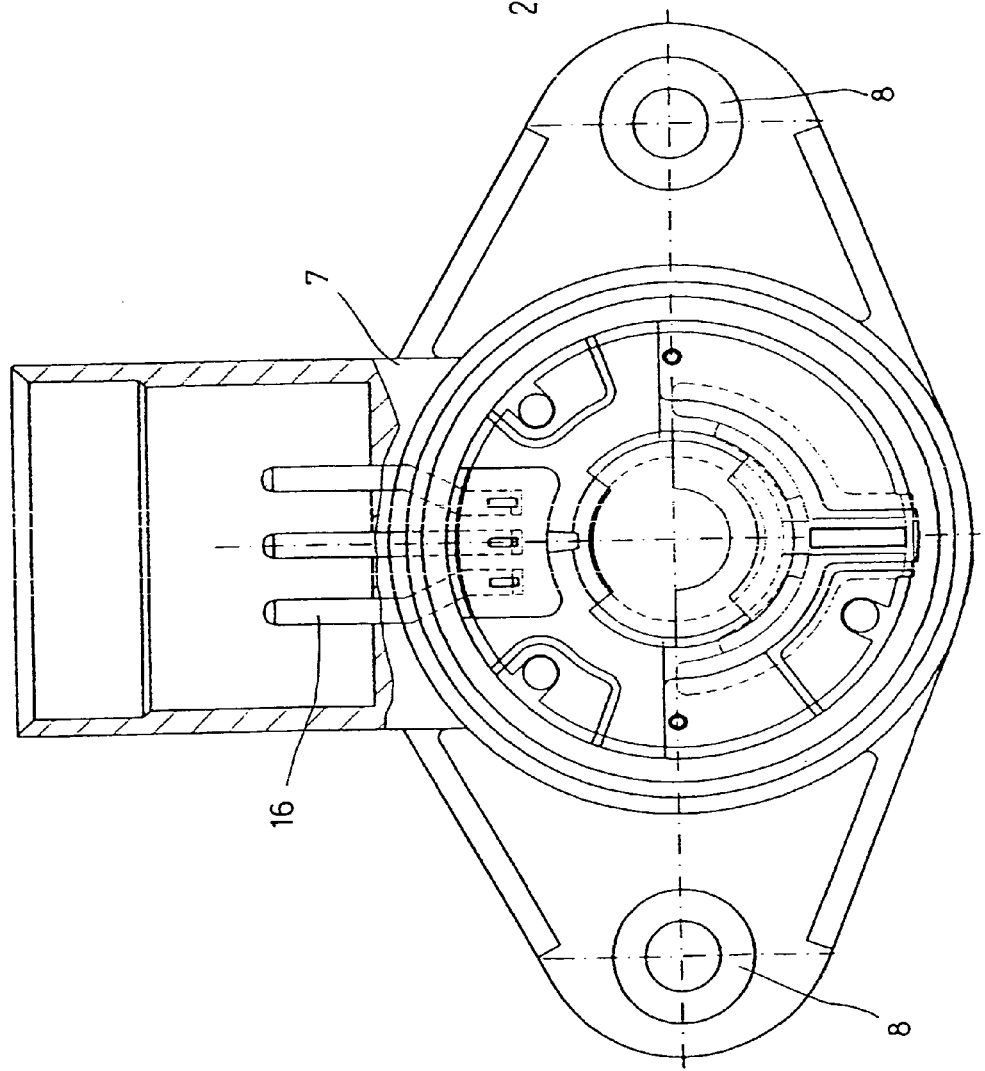

ROTATION ANGLE SENSOR

BACKGROUND OF THE INVENTION

The invention relates to a rotation angle sensor device that includes at least
- a rotor unit,
- a stator unit,
- a housing unit that is at least partially positioned around the rotor unit and the stator unit, and
- a bearing-shaft unit by means of which at least the rotor unit may be moved with respect to the stator unit.

A rotation path sensor to recognize the position and the path of a rotatable drive shaft is known from the German Patent Publication No. DE 198 57 017 A1. The sensor includes a stator and a rotor that is provided with connecting elements to connect it to the drive shaft and to a moveable measuring disk. Between the stator and the rotor a rocker bearing is positioned at a prestated distance from the axis of the rotor and is limited by the moveable measurement disk. The rotor has two elastic flaps as connecting elements that are loaded away from each other by an elastic link in order to ensure the connection with the drive shaft at a point distant from the rocker bearing. The sensor also includes means to have it built into the drive shaft.

A disadvantage in this device lies in the fact that the rotation path sensor is mounted in an enclosed housing that must also be placed onto a throttle plate housing that is also enclosed, even if the sensor housing is partitioned. Even if the rotor shaft can be placed onto the drive shaft, the sensor housing must always be connected with the throttle plate housing separately. Also, the shaft must have separate bearings, and a return spring must be provided for the rotation path sensor.

A rotational angle sensor device consisting of a stationary and a rotating unit with a rotor axis is known from the German Patent Publication No. DE 199 03 490 A1. Along with an actuation unit, the pre-mounted units are coupled to an end of the throttle plate element.

The European Patent Publication No. EP 10 24 267 A2 describes a positioning device for a throttle plate unit in which a throttle plate is positioned within a housing unit by a throttle plate shaft so that it may be adjusted. This positioning device includes at least:
- A Hall-effect rotational angle sensor device mounted on a throttle plate shaft, consisting of a stationary unit and a moveable unit that may be displaced with respect to the stationary unit, a drive unit (109), and
- A transmission positioned between the moveable unit and the drive unit.

The housing unit at least partially surrounds the stationary and moveable unit, whereby the stationary unit consists of a first and a second stator ring arc segment that provides a stator separation recess in which at least one Hall integrated circuit is positioned and at least partially retained in the housing unit. The moveable unit consists of a ring magnet arc segment that is at least partially separated by an air gap from the first and the second stator arc segment and that, together with a third stator ring arc segment, is at least partially held together in a toothed-wheel segment of the transmission, positioned across from the air gap.

A rotational angle sensor device, particularly for a throttle plate adjustment device, is also known from the European Patent Publication No. EP 10 54 237 A2. This sensor device includes at least:
- a stator unit with at least two stator segment elements that are positioned together to form a separation recess whereby at least one Hall sensor is positioned in the separation recess,
- a rotor unit with at least one ring magnet segment element moveable with respect to the stator unit,
- a plug unit, and
- a housing unit in which at least the stator unit is at least partially held,
- whereby the ring magnet segment element includes a link element and
- whereby the link element of the ring magnet segment element is shaped into the rotor unit.

For the latter known devices, the shaft must have separate bearings, and a return spring must be provided for the rotor unit.

SUMMARY OF THE INVENTION

A principal object of the present invention is to provide a rotational angle sensor device which is simpler than the corresponding devices known in the art.

This object, as well as other objects which will become apparent from the discussion that follows, are achieved, in accordance with the present invention, by providing a rotation angle sensor device which comprises:
(a) a rotor unit;
(b) a stator unit;
(c) a housing unit that is positioned at least partially around the rotor unit and the stator unit; and
(d) a bearing shaft unit, with which at least the rotor unit is moveable with respect to the stator unit.

According to the invention, the rotor unit includes at least one segment magnet that is so held by a magnet receiver unit that it is positioned at least partially within a cylindrical jacket of a rotor element.

The advantages achieved via the invention particularly consist of the fact that the segment magnet is held tangential to the cylinder jacket. This ensures that, on the one hand, exact measurement values are transmitted, and on the other hand, expensive magnetic material is not required.

Further objects of the present invention are achieved by providing a rotation angle sensor device of the type described above wherein the rotary unit includes at least one rotor element, the bearing shaft unit is constructed as at least one shaft receiver recess mounted in the rotor element, and the mount of the rotor element is taken along with the mounted shaft of a rotor actuation unit inserted into the shaft receiver recess.

The advantages achieved by the invention particularly consist of the fact that the rotor element is mounted on its own bearing, and, like a parasite, the rotational angle sensor device uses the bearing mount of its "host", thus creating a so-called flying bearing. This flying bearing may be very easily and quickly installed in that the shaft of the "host", i.e., the shaft of the rotor actuation unit may be simply inserted into the shaft receiver recess.

The rotor and the stator units may be based on a potentiometric, Hall electronic, or resistive magnetic principle. The flying bearing may thus be used for all sensors intended to detect rotational angle or rotational movements.

The rotor unit may include at least one rotor element. A first bearing shaft unit may be formed as at least one shaft receiver recess mounted in the rotor element so that the bearing of the rotor element may be taken over with a shaft mounted in the shaft receiver recess of a rotor actuation unit.

The rotor actuation unit may be a throttle plate unit, a throttle plate adjusting unit, or the like.

It is possible for the bearing shell to be connected with the rotor unit. However, the shaft element may also be connected with the rotor unit. This ensures intentional and controlled power transfer to the rotor unit. It further ensures that the bearing shell and/or the shaft element is/are held together, along with the rotor unit.

The rotor unit my include at least one segment magnet that is held by a magnet receiver unit so that it is held at least partially within a cylindrical jacket of a rotor unit.

The rotor unit may be of a magnetic non-conducting material into which the segment magnet and the magnetic receiver unit may at least partially be formed.

The stator unit may include a stator element that allows a free space at least between its stator segment elements into which at least an application-specific integrated circuit may be positioned. Preferably two application-specific integrated circuits are positioned in the free space that may be connected with a circuit board element. This provides a rotational angle sensor that operates on the Hall electronic principle, providing sensitive detection of changing rotational angle.

The shaft element may be connected with a lever. This lever is suitable for the transfer of angular movements to the shaft element.

The housing unit may consist of a sensor housing that may be closed with a covering element. This design of the housing allows simple mounting of the stator and rotor units with their partial elements. After mounting, the housing may be closed by the covering element and correspondingly sealed.

The sensor housing may at least partially surround plug elements that are connected with at least one circuit board element. The sensor housing simultaneously forms the parts of the plug by means of which the sensor may be connected.

For a full understanding of the present invention, reference should now be made to the following detailed description of the preferred embodiments of the invention as illustrated in the accompanying drawings.

BRIEF DESCRIPTION OF THE DRAWINGS

FIG. 3 a rotation angle sensor with a flying bearing in a perspective schematic overhead view.

FIG. 4 a view through a rotational angle sensor as in FIG. 3 along projection line IV—IV.

DESCRIPTION OF THE PREFERRED EMBODIMENTS

Figure 1:
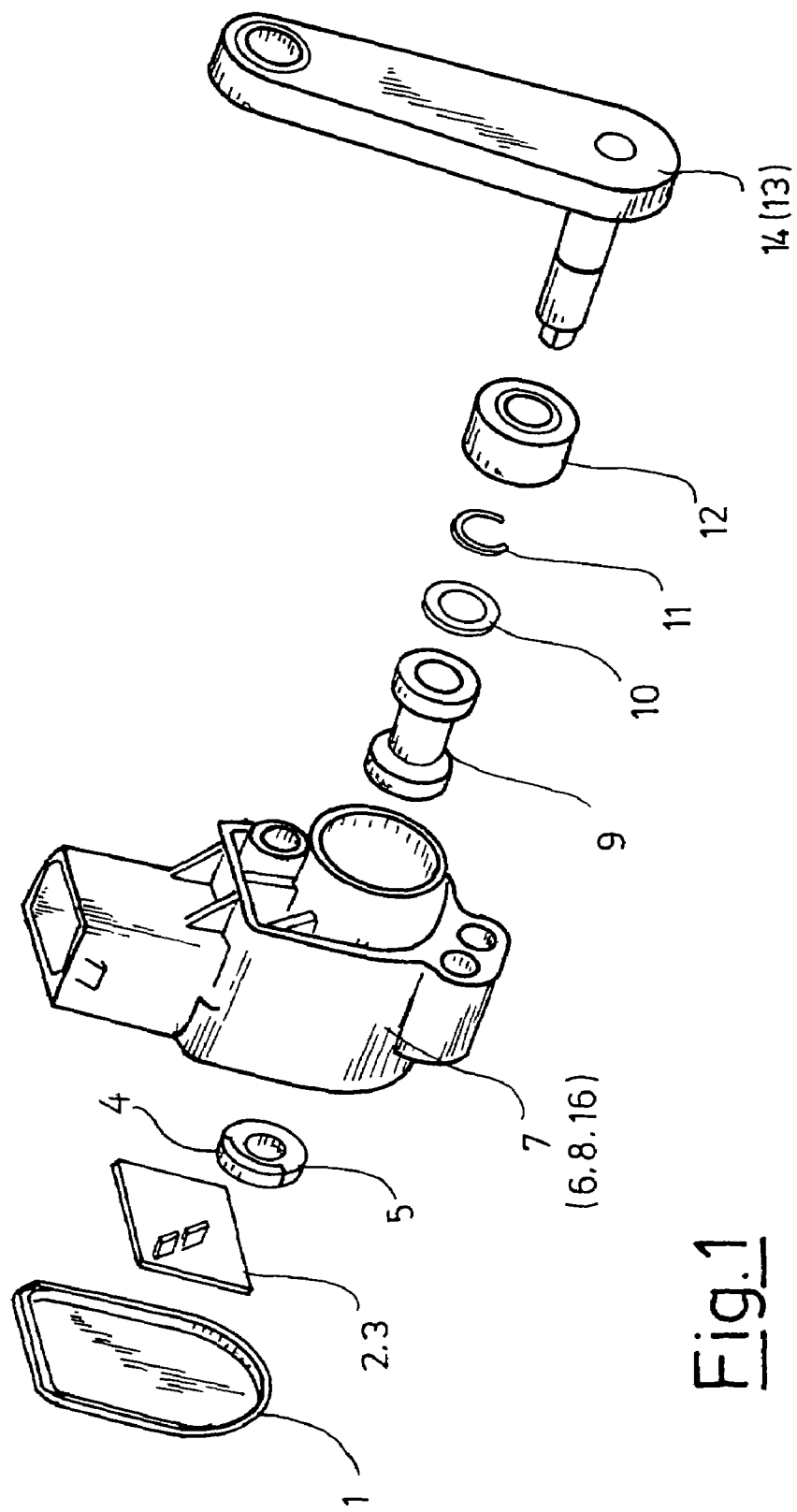
FIG. 1 a rotation angle sensor in an exploded, perspective schematic drawing.
Figure 2:
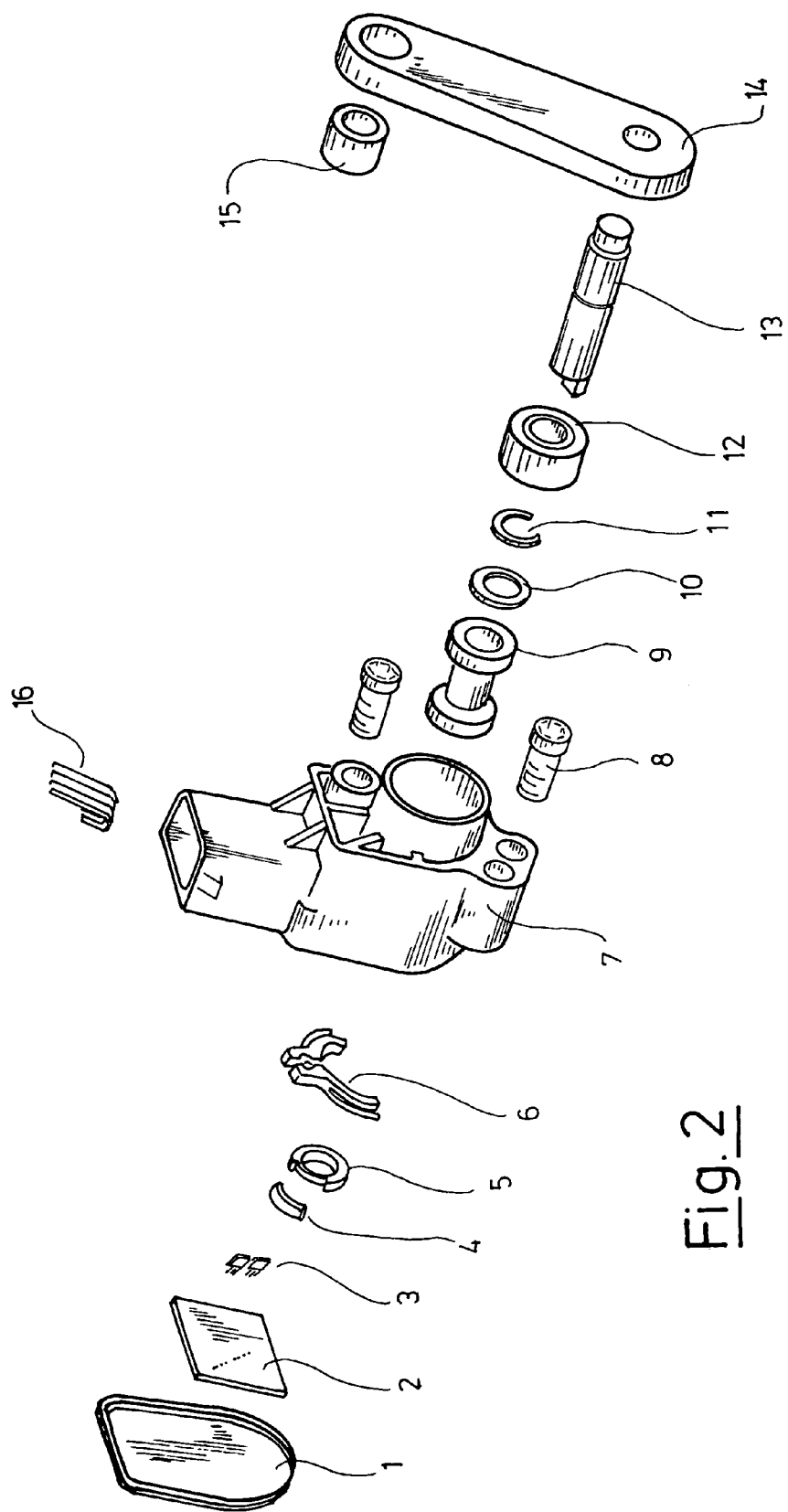
FIG. 2 a rotation angle sensor as in FIG. 1, in another exploded, perspective schematic drawing.

The preferred embodiments of the present invention will now be described with reference to FIGS. 1–4 of the drawings. Identical elements in the various figures are designated with the same reference numerals.

FIGS. 1 through 4 show a rotation angle sensor with a magnetic segment.

The rotation angle sensor consists of
a rotor unit 4, 5, 17, 19, 20, 21, 22.1, 22.2, 22.3, 23
a stator unit 2, 3, 6, and
a housing unit 1, 7, 8, 16.

The rotor unit surrounds the segment magnets 4 that are held by a magnet receiver unit 5. The magnet receiver unit 5 is shaped as a rotational cylinder element with a recess. The magnet segment 4 is positioned on the periphery of the magnet receiver unit 5. The magnet receiver unit 5 with the segment magnet 4 is held by a rotational cylinder element 19 of a rotor element 17 (see particularly FIGS. 3 & 4). The magnet receiver unit 5 and the magnet segment 4 are at least partially shaped or inserted in a cylinder jacket 23 of the rotational cylinder element 19 made of plastic.

The stator unit surrounds a stator element 6 that includes two stator segment elements separated by a gap. Two application-specific integrated circuits 3 are positioned in the space of the essentially horseshoe-shaped stator element 6. The two application-specific integrated circuits 3 are connected with a circuit board element 2. The described rotor and stator units are positioned within a sensor housing 7, as FIGS. 3 & 4 show. The housing 7 also receives a plug element 16 connected with the circuit board element 2. Two securing sockets 8 are included to fasten the sensor housing 7.

When these parts are mounted within the sensor housing 7, it is closed with a covering element 1. A cast seal 18 ensures that any gaps between the covering element 7 and the sensor housing 8 are sealed against liquids and dust.

A conventional bearing is provided to mount a shaft element 13 connected with a lever 14 in which a socket 15 is positioned.

The main elements of this mount are:
A bearing shell 9 that looks essentially like a bobbin, and
A radial shaft seal 12 shaped like a hollow cylinder.

The radial shaft seal is placed onto the shaft element 13. A securing ring 11 is placed into a recess of the shaft element, and an adapter washer 10 is placed before it. Subsequently, the bearing shell 9 is pressed onto the shaft element, and this unit is inserted with the bearing shell 9 into a bearing opening of the sensor housing 7 to the point that the shaft element 13 is held by the rotor element 17.

It is also possible that the bearing shell 9 is at least partially formed when the sensor housing 7 is formed. The bearing shell and the radial shaft seal may be made either of plastic or of metal. The material used depends on the application conditions.

Instead of the conventional bearing, a flying bearing is used in an otherwise conventionally-designed rotation angle sensor. The essence of the flying bearing consists of the use of the bearing as a "host". This "host" may be a bearing-mounted shaft of a throttle valve or similar device.

For this, the rotor element 17 is provided with a shaft receiver recess 20, and is divided into two clamp jaws 22.1, 22.2. Both clamp jaws 22.1, 22.2 are provided with a clamp ring recess 21. A spring ring may be placed into the clamp ring recess 21.

A rotation angle sensor with a rotor element 17 so shaped is mounted as a unit, and needs only to be mounted onto the mounted shaft of the "host" e.g., a throttle valve. The rotor element 17 is thus also mounted using the bearing mount of the "host." The conventional bearing described above is no longer necessary, allowing savings both in materials and assembly costs.

There has thus been shown and described a rotation angle sensor which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. Rotation angle sensor comprising in combination:
   (a) a sensor housing;
   (b) a rotor unit having at least one segment magnet, mounted for rotation in said housing;
   (c) a stator unit having a magnetic flux detection device, mounted in said housing adjacent said rotor;
   (d) a bearing shaft unit having a bearing shell and a radial shaft seal, mounted in said housing, said bearing shaft unit forming a shaft receiver recess mounted in the rotor unit
   (e) a rotor actuation unit inserted into the shaft receiver recess, said rotor actuation unit including a shaft element for moving said rotor unit with respect to said stator unit, whereby during manufacture, the bearing shell is inserted into the housing unit at least to the point of the rotor unit, and the radial shaft seal is inserted behind it, and the shaft element is pressed past the radial shaft seal and the bearing shell into the shaft receiver recess.

2. Device as in claim 1, wherein the rotor and the stator units operate in accordance with potentiometric, Hall electronic, or magnetic resistive principles.

3. Device as in claim 1, wherein the rotor unit includes at least one segment magnet that is held by a magnet receiver unit positioned at least partially within a cylindrical jacket.

4. Device as in claim 1, wherein the rotor actuation unit is a throttle adjustment unit for an engine.

5. Device as in claim 1, wherein the rotor unit is made of a non-conducting magnetic material into which the segment magnet and a magnet receiver unit are at least partially formed.

6. Device as in claim 1, wherein the stator unit includes a stator element that has a separation recess between two stator segment elements in which is positioned at least one application-specific integrated circuit (ASIC).

7. Device as in claim 6, wherein said two application-specific integrated circuits are connected with a circuit board element.

8. Device as in claim 7, wherein the housing unit includes a sensor housing that is closable by means of a covering element.

9. Device as in claim 8, wherein the sensor housing at least partially surrounds plug elements that are connected at least with the circuit board element.

10. Device as in claim 1, wherein at least one of the bearing shell and the radial shaft seal is made of a material selected from the group consisting of plastic and metal.

11. Device as in claim 1, wherein the rotor actuation unit further includes an actuation lever connected to the shaft element.

* * * * *